(12) United States Patent
Mizutani et al.

(10) Patent No.: US 10,065,400 B2
(45) Date of Patent: Sep. 4, 2018

(54) FUEL HOSE

(71) Applicant: SUMITOMO RIKO COMPANY LIMITED, Komaki-shi, Aichi (JP)

(72) Inventors: Koji Mizutani, Ichinomiya (JP); Yuki Yabuya, Kuwana (JP); Yuki Takahashi, Kasugai (JP)

(73) Assignee: SUMITOMO RIKO COMPANY LIMITED, Komaki-Shi (JP)

( * ) Notice: Subject to any disclaimer, the term of this patent is extended or adjusted under 35 U.S.C. 154(b) by 32 days.

(21) Appl. No.: 15/017,058

(22) Filed: Feb. 5, 2016

(65) Prior Publication Data

US 2016/0281886 A1    Sep. 29, 2016

(30) Foreign Application Priority Data

Mar. 27, 2015   (JP) ................. 2015-067143

(51) Int. Cl.
*F16L 11/04* (2006.01)
*B32B 27/34* (2006.01)
(Continued)

(52) U.S. Cl.
CPC .............. *B32B 27/34* (2013.01); *B32B 1/08* (2013.01); *B32B 7/12* (2013.01); *B32B 27/306* (2013.01);
(Continued)

(58) Field of Classification Search
CPC  B32B 1/08; B32B 27/08; B32B 27/34; Y10T 428/1352; Y10T 428/1393
(Continued)

(56) References Cited

U.S. PATENT DOCUMENTS 6,293,312 B1 *  9/2001  Stripe ............... F16L 11/04
                                                138/137
2005/0136205 A1 *  6/2005  Stoppelmann ........... B32B 1/08
                                                428/36.91
(Continued)

FOREIGN PATENT DOCUMENTS

| CN | 1640660 A | 7/2005 |
|---|---|---|
| CN | 102596555 A | 7/2012 |
| JP | 5-44874 A | 2/1993 |

OTHER PUBLICATIONS

Office Action with Search Report dated Sep. 22, 2017, issued in counterpart Chinese Application No. 201610147769.5, with English translation (15 pages).

*Primary Examiner* — Ellen S Wood
(74) *Attorney, Agent, or Firm* — Westman, Hattori, Daniels & Adrian, LLP

(57) ABSTRACT

A fuel hose excellent in calcium chloride resistance, can achieve both low fuel permeability and a pulsation-reducing property, and is excellent in interlayer adhesiveness as well. The fuel hose includes: an inner layer (1) formed of a specific resin, such as polyamide 9T; an intermediate layer (2) formed of the following component (B), which is arranged in contact with an outer peripheral surface of the inner layer (1); and an outer layer (3) formed of the following component (C), which is arranged in contact with an outer peripheral surface of the intermediate layer (2), in which the layers are bonded to each other: (B) a polyamide terpolymer having copolymerized therein the following components (b1), (b2), and (b3): (b1) polyamide 6; (b2) at least one selected from polyamide 66 and polyamide 610; and (b3) polyamide 12; (C) an aliphatic polyamide resin except for polyamide 6 and polyamide 66.

14 Claims, 2 Drawing Sheets

(51) Int. Cl.
*B32B 7/12* (2006.01)
*B32B 27/30* (2006.01)
*B32B 27/32* (2006.01)
*B32B 1/08* (2006.01)

(52) U.S. Cl.
CPC ........ *B32B 27/322* (2013.01); *B32B 2270/00* (2013.01); *B32B 2307/50* (2013.01); *B32B 2307/54* (2013.01); *B32B 2307/546* (2013.01); *B32B 2307/714* (2013.01); *B32B 2307/7265* (2013.01); *B32B 2307/732* (2013.01); *B32B 2597/00* (2013.01); *F16L 11/04* (2013.01)

(58) Field of Classification Search
USPC .................................. 428/36.91, 34.1, 35.7
See application file for complete search history.

(56) References Cited

U.S. PATENT DOCUMENTS

2012/0003416 A1* 1/2012 Mizutani .................. B32B 1/08
428/36.91
2014/0246111 A1* 9/2014 Zimmer .................... F16L 9/14
138/140

* cited by examiner

FUEL HOSE

BACKGROUND

1. Field of the Invention

The present invention relates to a fuel hose, and more particularly, to a hose for transporting an automotive fuel, such as gasoline, alcohol-mixed gasoline, or diesel fuel.

2. Description of the Related Art

As a result of adoption of a direct injection engine and engine downsizing, there is a need for precise injection of a fuel. However, precise injection based only on electronic control of an injector has reached a limit, and there is a need for uniform transportation of the fuel, that is, a reduction in pulsation during fuel transportation.

In piping to be applied to a fuel supply system of an automobile, a fuel hose forms a passage for supplying a fuel to be pumped from a fuel pump, and is connected to a fuel delivery pipe. In such piping, the fuel is transported by pressurizing the fuel in the hose with the pump so as to have a preset constant pressure. In a system in which the fuel is supplied in divided portions to the engine with a plurality of fuel delivery apparatus, there is a risk in that pulsation (so-called fuel pressure variation) may be generated by one fuel delivery apparatus in the piping, which causes an excess or deficiency in pressure of the fuel in another fuel delivery apparatus, resulting in an error in amount of the fuel to be injected with respect to a desired amount. Accordingly, there is a need for a fuel hose configured to reduce the pulsation in the piping. In this context, it is conceivable to use a hitherto used fuel hose, such as a hose made of a resin, a hose made of a rubber, or a laminated hose of a resin and a rubber (see, for example, Japanese Patent Application Laid-open No. Hei 5-44874), but these hoses have the following problems.

That is, the hose made of a resin provides an effect of low fuel permeability (fuel barrier property), but has poor flexibility owing to its high rigidity, resulting in a poor pulsation-reducing effect. In addition, the hose made of a rubber provides a pulsation-reducing effect, but has a problem of being less satisfactory in terms of low fuel permeability (fuel barrier property). Further, in the laminated hose including a rubber and a resin layer serving as an inner layer, it is difficult to achieve both the low fuel permeability (fuel barrier property) and the pulsation-reducing property while keeping interlayer adhesiveness.

Therefore, hitherto, an approach to reducing the pulsation has involved, for example, using such fuel hose as described above in combination with a damping part, such as a pulsation damper (P/D), or increasing an overall length of the fuel hose.

However, the damping part, such as the pulsation damper (P/D), is expensive, and the increase in overall length of the fuel hose increases cost. Besides, such approach is not compatible with a need for a smaller engine room. Accordingly, there is a need for a novel method of coping with the problems. In addition, there is also a demand for performance such as calcium chloride resistance (resistance to a snow-melting agent) in a fuel hose for an automobile.

SUMMARY OF THE INVENTION

A fuel hose which is excellent in calcium chloride resistance, can achieve both low fuel permeability (fuel barrier property) and a pulsation-reducing property, and is excellent in interlayer adhesiveness as well is provided.

According to one embodiment, there is provided a fuel hose, comprising: a tube-shaped inner layer formed of a component (A); an intermediate layer formed of a component (B), which is arranged in contact with an outer peripheral surface of the inner layer; and an outer layer formed of a component (C), which is arranged in contact with an outer peripheral surface of the intermediate layer, wherein the layers are bonded to each other; wherein the component (A) is at least one selected from the group consisting of polyamide 9T, an ethylene-vinyl alcohol copolymer resin, an acid-modified ethylene-tetrafluoroethylene copolymer, and acid-modified polyethylene; wherein the component (B) is a polyamide terpolymer having copolymerized therein the following components (b1), (b2), and (b3): (b1) polyamide 6; (b2) at least one selected from polyamide 66 and polyamide 610; and (b3) polyamide 12; and wherein the component (C) is an aliphatic polyamide resin, wherein the aliphatic polyamide resin does not contain any of polyamide 6 and polyamide 66.

In order to overcome challenges concerning low fuel permeability, calcium chloride resistance, and the like, with attention focused on the layer construction of the fuel hose, the inventors have conceived of adopting a construction including the inner layer formed of the specific resin (A) excellent in low fuel permeability, such as polyamide 9T, and the outer layer formed of the predetermined aliphatic polyamide resin (C) excellent in calcium chloride resistance. In addition, when arranging the intermediate layer excellent in interlayer adhesiveness to each of the inner layer and the outer layer so as to obtain a pulsation-reducing property by virtue of the intermediate layer, as a result, the desired object can be achieved by using the specific polyamide terpolymer (B) as a material for the intermediate layer.

In the specific polyamide terpolymer (B) serving as the material for the intermediate layer, polyamide 6 (component b1) mainly contributes to the adhesiveness to the inner layer, and polyamide 12 (component b3) mainly contributes to the calcium chloride resistance and the adhesion to the outer layer. In addition, polyamide 66 or the like (component b2) has an action of breaking the crystal structures of the component b1 and the component b3, and thus contributes to the pulsation-reducing property. Consequently, the intermediate layer can be firmly bonded to each of the inner layer formed of the specific resin (A) and the outer layer formed of the aliphatic polyamide resin (C) in an adhesive-less manner, and moreover, a desired pulsation-reducing property can be obtained.

The fuel hose according to the one embodiment includes the inner layer formed of the specific resin (A), such as polyamide 9T, the intermediate layer formed of the specific polyamide terpolymer (B), which is arranged in contact with the outer peripheral surface of the inner layer, and the outer layer formed of the predetermined aliphatic polyamide resin (C), which is arranged in contact with the outer peripheral surface of the intermediate layer. Accordingly, the fuel hose according to the one embodiment is excellent in calcium chloride resistance, can achieve both low fuel permeability (fuel barrier property) and a pulsation-reducing property, and is excellent in interlayer adhesiveness among the layers despite their adhesive-less construction by virtue of the intermediate layer.

Particularly when, in the polyamide terpolymer (B) serving as the material for the intermediate layer, the content of polyamide 6 (component b1) is from 60 wt % to 90 wt %, the content of polyamide 66 or the like (component b2) is from 5 wt % to 20 wt %, and the content of polyamide 12

(component b3) is from 5 wt % to 20 wt %, the fuel hose becomes more satisfactory in interlayer adhesiveness and pulsation-reducing property.

In addition, when the aliphatic polyamide resin (C) serving as the material for the outer layer is a resin such as polyamide 12, polyamide 11, polyamide 1012, polyamide 1010, polyamide 612, or polyamide 610, the fuel hose becomes more satisfactory in calcium chloride resistance and the like.

In addition, when the component b2 in the polyamide terpolymer (B) serving as the material for the intermediate layer is only polyamide 66, the fuel hose becomes more satisfactory in pulsation-reducing property and the like. In addition, when the component (A) is polyamide 9T, the fuel hose becomes more satisfactory in flexibility and fuel barrier property. In addition, when the component (C) comprises polyamide 12, the fuel hose becomes more satisfactory in calcium chloride resistance, interlayer adhesiveness and the like.

Accordingly, when the component (A) is polyamide 9T and the component (b2) comprises polyamide 66, when the component (A) is polyamide 9T and the component (C) comprises polyamide 12, or when the component (b2) comprises polyamide 66 and the component (C) comprises polyamide 12, the fuel hose becomes more satisfactory in the required properties. Further, when the component (A) is polyamide 9T, the component (b2) comprises polyamide 66, and the component (C) comprises polyamide 12, the fuel hose becomes further more satisfactory in the required properties.

In addition, when the thickness of the inner layer is from 0.05 mm to 0.4 mm, the thickness of the intermediate layer is from 0.2 mm to 0.8 mm, and the thickness of the outer layer is from 0.1 mm to 0.5 mm, the fuel hose becomes satisfactory in the required properties. Further, when the thickness of the inner layer is from 0.05 mm to 0.3 mm, the thickness of the intermediate layer is from 0.3 mm to 0.7 mm, and the thickness of the outer layer is from 0.2 mm to 0.4 mm, the fuel hose becomes more satisfactory in the required properties.

In addition, when the fuel hose has an inner diameter of from 1 mm to 40 mm, and has an outer diameter of from 2 mm to 43 mm, the fuel hose becomes satisfactory in the required properties. Further, when the fuel hose has an inner diameter of from 2 mm to 36 mm, and has an outer diameter of from 3 mm to 40 mm, the fuel hose becomes more satisfactory in the required properties.

DETAILED DESCRIPTION OF PARTICULAR EMBODIMENTS

Next, an embodiment of the present invention is described in detail. However, the present invention is not limited to the embodiment.

Figure 1:
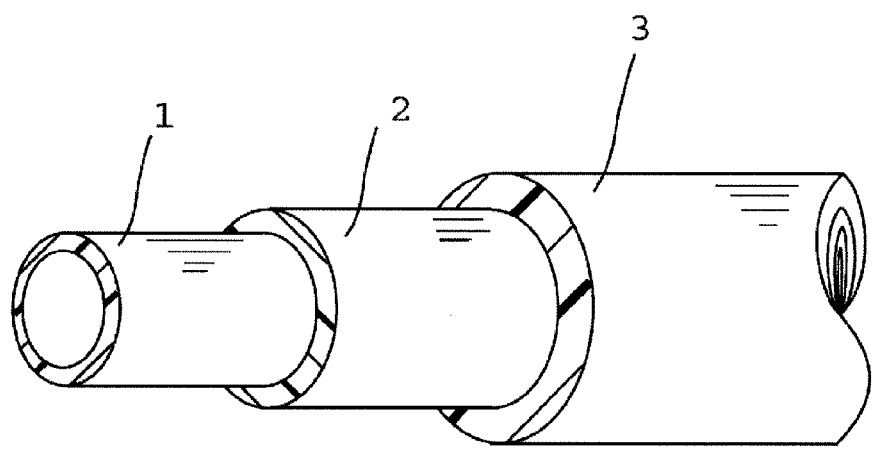
FIG. 1 is a schematic view for illustrating an example of a fuel hose.

A fuel hose has, for example, a construction in which, as illustrated in FIG. 1, an intermediate layer 2 is laminated and formed on the outer peripheral surface of a tube-shaped inner layer 1 in which a fuel is allowed to flow, and an outer layer 3 is further laminated and formed on the outer peripheral surface of the intermediate layer 2. In addition, the inner layer 1 is formed of the following component (A), the intermediate layer 2 is formed of the following component (B), and the outer layer 3 is formed of the following component (C). Further, the layers are bonded to each other in an adhesive-less manner. It should be noted that the phrase "formed of" means that the layers are substantially formed of the following resins, and does not mean that the incorporation of a material other than the resins which does not affect the present invention is excluded:

(A) at least one selected from the group consisting of polyamide 9T, an ethylene-vinyl alcohol copolymer resin, an acid-modified ethylene-tetrafluoroethylene copolymer, and acid-modified polyethylene;

(B) a polyamide terpolymer having copolymerized therein the following components (b1), (b2), and (b3):
  (b1) polyamide 6;
  (b2) at least one selected from polyamide 66 and polyamide 610; and
  (b3) polyamide 12;

(C) an aliphatic polyamide resin, provided that polyamide 6 and polyamide 66 are excluded from a material for the outer layer 3 owing to their inferior calcium chloride resistance.

As described above, as a material for the inner layer 1, the polyamide 9T (PA9T), the ethylene-vinyl alcohol copolymer resin (EVOH), the acid-modified ethylene-tetrafluoroethylene copolymer (acid-modified ETFE), and the acid-modified polyethylene (acid-modified PE) may each be used alone, or two or more kinds thereof may be used in combination. Of those, from the viewpoints of flexibility and a fuel barrier property, PA9T is preferably used. Herein, the acid-modified ETFE or the acid-modified PE is ETFE or PE modified with an acid such as a carboxylic acid, maleic acid, maleic anhydride, citraconic acid, or citraconic anhydride.

In addition, as described above, as a material for the intermediate layer 2, the polyamide terpolymer having copolymerized therein polyamide 6 (component b1), at least one selected from polyamide 66 and polyamide 610 (component b2), and polyamide 12 (component b3) is used.

Particularly when, in the polyamide terpolymer, the content of polyamide 6 (component b1) is from 60 wt % to 90 wt %, the content of polyamide 66 or the like (component b2) is from 5 wt % to 20 wt %, and the content of polyamide 12 (component b3) is from 5 wt % to 20 wt %, the fuel hose becomes more excellent in interlayer adhesiveness and pulsation-reducing property.

In addition, when the component b2 in the polyamide terpolymer is only polyamide 66, the fuel hose becomes more excellent in pulsation-reducing property and the like.

The polyamide 6 (component b1) in the polyamide terpolymer refers to a portion of the copolymer using ε-caprolactam as its material. In addition, the polyamide 66 (component b2) in the polyamide terpolymer refers to a portion of the copolymer using hexamethyleneammonium adipate as its material, and the polyamide 610 (component b2) in the polyamide terpolymer refers to a portion of the copolymer using hexamethylenediamine and sebacic acid as its materials. In addition, the polyamide 12 (component b3) in the polyamide terpolymer refers to a portion of the copolymer using ω-laurolactam as its material. In addition, a weight ratio among those materials used in the preparation of the polyamide terpolymer corresponds to a weight ratio among the components b1 to b3 in the polyamide terpolymer.

Now, an example of a method of preparing the polyamide terpolymer is described. That is, first, a polymerization vessel of an autoclave is loaded with the respective materials for the components b1 to b3 at a predetermined ratio, and is purged with nitrogen. After that, the temperature of the autoclave is increased to about 180° C., and, while the contents in the polymerization vessel are stirred and the pressure in the polymerization vessel is increased, the temperature is further increased to about 240° C. Then, after a lapse of about 2 hours at that temperature, the pressure in the polymerization vessel is returned to normal pressure, and nitrogen is again introduced into the polymerization vessel. Under the stream of nitrogen, a polymerization reaction is performed for about 1 hour, and then polymerization is performed under reduced pressure for about 2 hours. Subsequently, nitrogen is again introduced into the polymerization vessel to return the pressure to normal pressure, and then the stirrer is stopped. A product taken out as a strand is pelletized, and then unreacted monomers in the pellets are removed by extraction with boiling water, followed by drying. Thus, pellets of a polyamide terpolymer of interest (material for the intermediate layer 2) may be obtained.

Meanwhile, as described above, an aliphatic polyamide resin other than polyamide 6 and polyamide 66 is used as the aliphatic polyamide resin (C) serving as a material for the outer layer 3. In particular, from the viewpoint of calcium chloride resistance or the like, polyamide 12 (PA12), polyamide 11 (PA11), polyamide 1012 (PA1012), polyamide 1010 (PA1010), polyamide 612 (PA612), or polyamide 610 (PA610) is preferably used, and polyamide 12 (PA12) is more preferably used. In addition, those aliphatic polyamide resins may each be used alone, or two or more kinds thereof may be used in combination.

It should be noted that the resins described as the components (A) to (C) are used as the materials for the inner layer 1, the intermediate layer 2, and the outer layer 3 in the fuel hose, and in addition to the resins, the layers may contain, for example, the following materials as required: pigments, such as carbon black and titanium oxide; fillers, such as calcium carbonate; plasticizers, such as a fatty acid ester, mineral oil, and butylbenzenesulfonamide; antioxidants, such as a hindered phenol-based antioxidant and a phosphorus-based heat stabilizer; anti-heat aging agents; impact modifiers, such as an α-polyolefin; UV protection agents; antistatic agents; reinforcing agents, such as organic fiber, glass fiber, carbon fiber, and metal whiskers; and flame retardants.

The fuel hose illustrated in FIG. 1 may be produced, for example, as described below. That is, the material for the inner layer 1, the material for the intermediate layer 2, and the material for the outer layer 3 as described above are each prepared. The materials for the layers are, for example, subjected to co-extrusion molding using an extrusion molding machine (multi-layer extrusion molding machine manufactured by Research Laboratory of Plastics Technology Co., Ltd.), and the co-extruded molten tube is passed through a sizing die. Thus, there may be produced a fuel hose having a three-layer structure in which the intermediate layer 2 is formed on the outer peripheral surface of the inner layer 1 and the outer layer 3 is further formed on the outer peripheral surface of the intermediate layer 2. When the melt extrusion (co-extrusion) molding is performed as described above, the layers are satisfactorily bonded to each other.

It should be noted that, when the hose is formed so as to have a bellows shape, a bellows-shaped hose having predetermined dimensions may be produced by passing the co-extruded molten tube through a corrugated molding machine.

In the fuel hose of the present invention, the thickness of the inner layer 1 is preferably from 0.05 mm to 0.4 mm, particularly preferably from 0.05 mm to 0.3 mm. The thickness of the intermediate layer 2 is preferably from 0.2 mm to 0.8 mm, particularly preferably from 0.3 mm to 0.7 mm. The thickness of the outer layer 3 is preferably from 0.1 mm to 0.5 mm, particularly preferably from 0.2 mm to 0.4 mm.

In addition, the fuel hose has an inner diameter of generally from 1 mm to 40 mm, preferably from 2 mm to 36 mm, and an outer diameter of generally from 2 mm to 43 mm, preferably from 3 mm to 40 mm.

It should be noted that the fuel hose may include, in addition to the structure illustrated in FIG. 1, an innermost layer formed on the inner peripheral surface of the inner layer 1 as long as the effects of the present invention are not impaired.

The fuel hose may be used for a fuel injection system. In addition, the fuel hose is suitably used as a hose for transporting an automotive fuel, such as gasoline, alcohol-mixed gasoline, diesel fuel, compressed natural gas (CNG), or liquefied petroleum gas (LPG). However, its use is not limited thereto, and the fuel hose may also be used as a hose for transporting a fuel for a fuel cell automobile, such as methanol, hydrogen, or dimethyl ether (DME).

EXAMPLES

Next, Examples of the present invention are described together with Comparative Examples. However, the present invention is not limited to these Examples.

First, the following materials were prepared as materials for inner layers prior to Examples and Comparative Examples.

[PA9T]
Polyamide 9T (manufactured by Kuraray Co., Ltd., GENESTAR N1001D)
[Acid-Modified ETFE]
Acid-modified ethylene-tetrafluoroethylene copolymer (manufactured by Asahi Glass Co., Ltd., AH2000)

In addition, the following materials were prepared as materials for outer layers.
[PA12]
Polyamide 12 (manufactured by Ube Industries, Ltd., 3030JI26L)
[PA6]
Polyamide 6 (manufactured by Toray Industries, Inc., AMMAN CM1017)

In addition, as materials for intermediate layers, there were prepared materials (B1 to B6) obtained in accordance with preparation methods to be described below.

[Preparation of Materials (B1 to B5) for Intermediate Layers]

A polymerization vessel of an autoclave was loaded with ε-caprolactam serving as a polyamide 6 component (component b1), a 50% aqueous solution of hexamethyleneammonium adipate serving as a polyamide 66 component (component b2), and ω-laurolactam serving as a polyamide 12 component (component b3) at a ratio shown in Table 1 below, and was purged with nitrogen. After that, the temperature of the autoclave was increased to 180° C. Subsequently, while the contents in the polymerization vessel were stirred and the pressure in the polymerization vessel was adjusted to 1.72 MPa, the temperature of the autoclave was increased to 240° C. Then, 2 hours after the temperature had reached 240° C., the pressure in the polymerization vessel was returned to normal pressure over about 2 hours. After that, nitrogen was again introduced into the polymerization vessel, and under the nitrogen stream, a polymerization reaction was performed for 1 hour, followed by polymerization under a reduced pressure of 650 Torr (86.7 kPa) for 2 hours. Subsequently, nitrogen was again introduced into the polymerization vessel to return the pressure to normal pressure, and then the stirrer was stopped. A product take out as a strand was pelletized. Then, unreacted monomers in the pellets were removed by extraction with boiling water, followed by drying. Thus, there were obtained pellets of polyamide terpolymers having copolymerized therein the components b1 to b3 at weight ratios shown in Table 1 below (materials B1 to B5 for intermediate layers).

TABLE 1

| | Material for intermediate layer | | | | (wt %) |
|---|---|---|---|---|---|
| | B1 | B2 | B3 | B4 | B5 |
| b1 | 90 | 60 | 80 | 95 | 50 |
| b2 | 5 | 20 | 10 | 2.5 | 30 |
| b3 | 5 | 20 | 10 | 2.5 | 30 |

Examples 1 to 8, and Comparative Examples 1 and 2

Based on each combination shown in Table 2 and Table 3 below, the materials for the layers were subjected to melt extrusion molding (co-extrusion molding) into a hose shape using an extrusion molding machine (multi-layer extrusion molding machine manufactured by Research Laboratory of Plastics Technology Co., Ltd.), to thereby produce a laminated hose (fuel hose) having an inner diameter of 12 mm. It should be noted that the thickness of the inner layer was set to 0.2 mm, the thickness of the intermediate layer was set to 0.5 mm, and the thickness of the outer layer was set to 0.3 mm. In addition, for Comparative Example 2, a fuel hose having a two-layer structure formed of the inner layer and the outer layer was produced without forming the intermediate layer, and for each of the other Examples and Comparative Example, a fuel hose having a three-layer structure was produced.

Each of the fuel hoses of Examples and Comparative Examples thus obtained was evaluated for its characteristics in accordance with the following criteria. The results are collectively shown below in Table 2 and Table 3.

[Fuel Barrier Property (Low Fuel Permeability)]

Simulated alcohol-added gasoline having mixed therein toluene, isooctane, and ethanol at a ratio of 40:40:20 (volume ratio) was prepared as gasoline for an evaluation test. Then, a constant-pressure permeation rate measuring apparatus for hoses (manufactured by GTR Tec Corporation, GTR-TUBE3-TG) was used to measure the permeation coefficient of the gasoline for an evaluation test filled in each of the fuel hoses at 40° C. for 1 month (unit: mg/m/day). Evaluation was performed as follows: the case where the measured value was less than 20 (mg/m/day) was represented by Symbol "0", and the case where the measured value was 20 (mg/m/day) or more was represented by Symbol X.

[Calcium Chloride Resistance]

A strip-shaped sample obtained by cutting each of the fuel hoses to a width of 10 mm was subjected to immersion treatment in boiling water for 24 hours while being stretched by 20% with a stretching jig. After that, a 50 wt % calcium chloride solution was applied onto the entire surface of the sample, and the resultant was subjected to heat treatment at 100° C. for 24 hours. Evaluation was performed as follows: the case where a crack was generated in the surface of the sample as a result of the treatment was represented by Symbol "x", and the case where no crack was generated in the surface of the sample was represented by Symbol "0".

[Interlayer Adhesiveness]

Each of the fuel hoses was cut to a width of 10 mm to produce a strip-shaped sample. Then, the layers of each sample were partially peeled from each other, and the peeled portion of each sample was held with chucks of a tensile tester. 180° peel strength (N/cm) was measured under the condition of a tensile rate of 50 mm/min. It should be noted that, in Comparative Example 2, peel strength between the inner layer and the outer layer was evaluated, and in each of the other Examples and Comparative Example, peel strength between the inner layer and the intermediate layer, and peel strength between the intermediate layer and the outer layer were evaluated. In addition, evaluation was performed as follows: the case where the peel strength was 20 N/cm or more was represented by Symbol "0", the case where the peel strength was 15 N/cm or more and less than 20 N/cm was represented by Symbol "Δ", and the case where the peel strength was less than 15 N/cm was represented by Symbol "x".

[Pulsation-Reducing Property]

Figure 2:
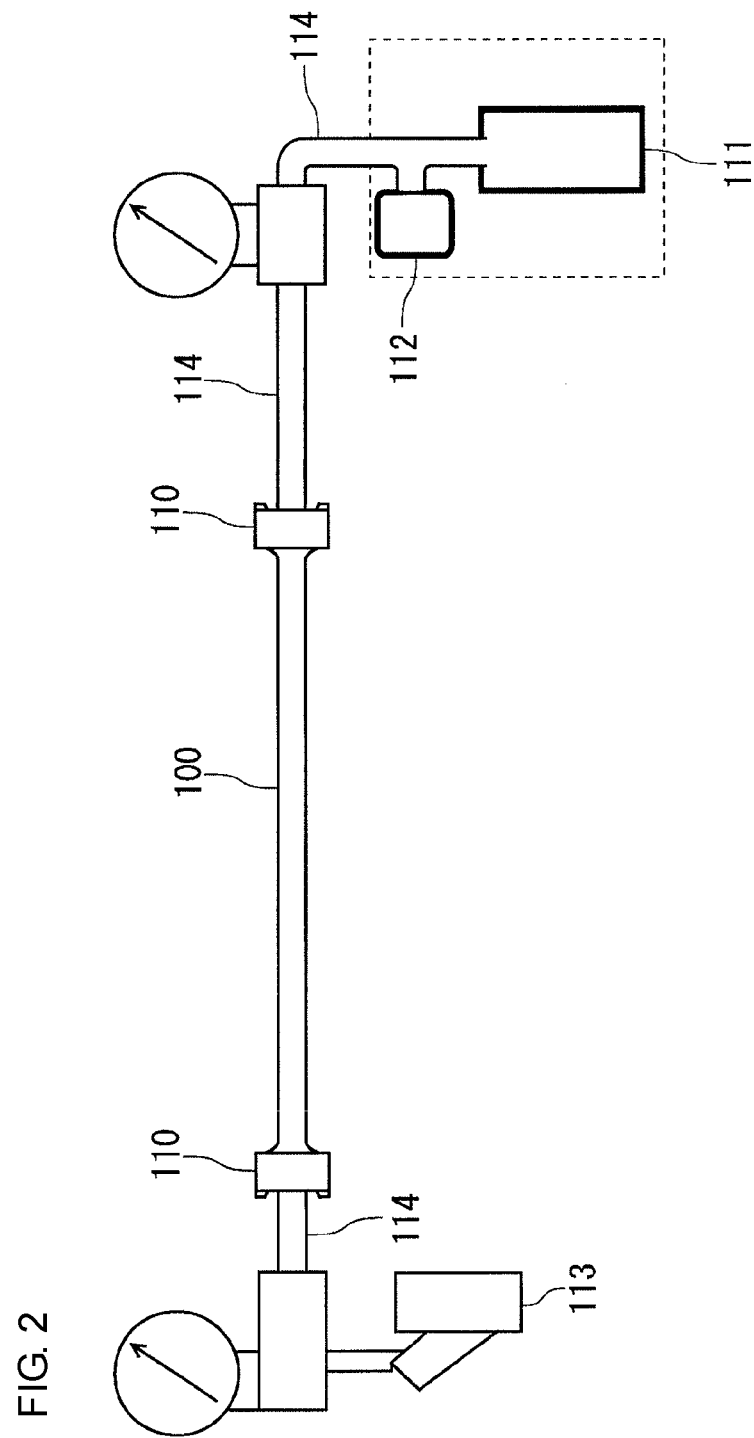
FIG. 2 is a schematic view for illustrating a test apparatus for evaluating a pulsation-reducing property.

FIG. 2 is an illustration of a test apparatus for evaluating the pulsation-reducing property of a fuel hose. Reference numeral 100 denotes a sample hose, reference numeral 110 denotes a quick connector, reference numeral 111 denotes a fuel pump, reference numeral 112 denotes a regulator, reference numeral 113 denotes an injector, and reference numeral 114 denotes a pipe.

The sample hose 100 was produced by cutting each of the fuel hoses of Examples and Comparative Examples to a length of 200 mm. Then, a pressure variation value (ΔP) was calculated by the following procedure. Evaluation was performed as follows: the case where the ΔP was 150 kPa or more was represented by Symbol "x", the case where the ΔP was 140 kPa or more and less than 150 kPa was represented by Symbol "Δ", and the case where the ΔP was less than 140 kPa was represented by Symbol "0".

(Measurement Conditions)
Injector cycle: 120 msec (when 1,000 rpm is assumed)
Injector valve-opening time: 6 (msec)
Evaluation temperature: room temperature (25° C.)
Measured part: The fuel pressure (P) at the injector part is measured.
Fluid for test: SHELLSOL (1) The sample hose 100 is mounted as illustrated in FIG. 2, and is left to stand at room temperature (25° C.) for 1 hour to remove air.

(2) The whole is kept for about 30 minutes until the oil temperature in the fuel pump 111 (saturated at about 50° C.) becomes constant.

(3) The valve-opening time of the injector 113 is set to 6 sec.

(4) A peak-to-peak distance is read from a graph of measurement results, and the pressure variation value (ΔP) is calculated by the following equation.

$$\Delta P(\text{kPa}) = P\text{max} - P\text{min}$$

TABLE 2

|  |  | Example 1 | Example 2 | Example 3 | Example 4 | Example 5 | Example 6 |
|---|---|---|---|---|---|---|---|
| Inner layer | | PA9T | PA9T | PA9T | Acid-modified ETFE | Acid-modified ETFE | Acid-modified ETFE |
| Intermediate layer | | B1 | B2 | B3 | B1 | B2 | B3 |
| Outer layer | | PA12 | PA12 | PA12 | PA12 | PA12 | PA12 |
| Fuel barrier property | mg/m/day | 7.8 | 8.0 | 8.1 | 15.4 | 15.2 | 15.0 |
| | Evaluation | ○ | ○ | ○ | ○ | ○ | ○ |
| Calcium chloride resistance | | ○ | ○ | ○ | ○ | ○ | ○ |
| Interlayer adhesiveness | Between inner layer and intermediate layer | N/cm | 34 | 22 | 29 | 40 | 30 | 35 |
| | Evaluation | ○ | ○ | ○ | ○ | ○ | ○ |
| | Between intermediate layer and outer layer N/cm | 24 | 40 | 32 | 25 | 39 | 33 |
| | Evaluation | ○ | ○ | ○ | ○ | ○ | ○ |
| | Between inner layer and outer layer N/cm | — | — | — | — | — | — |
| | Evaluation | — | — | — | — | — | — |
| Pulsation-reducing property | ΔP (kPa) | 134 | 124 | 129 | 133 | 123 | 128 |
| | Evaluation | ○ | ○ | ○ | ○ | ○ | ○ |

TABLE 3

|  |  | Example 7 | Example 8 | Comparative Example 1 | Comparative Example 2 |
|---|---|---|---|---|---|
| Inner layer | | PA9T | PA9T | PA9T | PA9T |
| Intermediate layer | | B4 | B5 | B3 | — |
| Outer layer | | PA12 | PA12 | PA6 | PA12 |
| Fuel barrier property | mg/m/day | 8.3 | 8.5 | 8.6 | 8.2 |
| | Evaluation | ○ | ○ | ○ | ○ |
| Calcium chloride resistance | | ○ | ○ | x | ○ |
| Interlayer adhesiveness | Between inner layer and intermediate layer N/cm | 44 | 16 | 28 | — |
| | Evaluation | ○ | Δ | ○ | — |
| | Between intermediate layer and outer layer N/cm | 15 | 45 | >50 | — |
| | Evaluation | Δ | ○ | ○ | — |
| | Between inner layer and outer layer N/cm | — | — | — | 0.9 |
| | Evaluation | — | — | — | x |
| Pulsation-reducing property | ΔP (kPa) | 145 | 121 | 131 | 150 |
| | Evaluation | Δ | ○ | ○ | x |

As shown above in Table 2 and Table 3, the fuel hoses of Examples 1 to 8 each provided the following results: a high evaluation was obtained in each of fuel barrier property, calcium chloride resistance, interlayer adhesiveness, and pulsation-reducing property. It should be noted that the fuel hose of Example 7 had a low content of polyamide 12 in the polyamide terpolymer serving as the material for the intermediate layer as compared to the other Examples, and hence provided slightly inferior results in interlayer adhesiveness between the intermediate layer and the outer layer and pulsation-reducing property as compared to the other Examples. In addition, the fuel hose of Example 8 had a high content of polyamide 12 in the polyamide terpolymer serving as the material for the intermediate layer as compared to the other Examples, and hence provided a slightly inferior result in interlayer adhesiveness between the inner layer and the intermediate layer as compared to the other Examples.

In addition, in contrast to the fuel hoses of Examples described above, the fuel hose of Comparative Example 1 used polyamide 6 as the material for the outer layer, and hence provided an inferior result in calcium chloride resistance. The fuel hose of Comparative Example 2 included no intermediate layer, and hence was poor in interlayer adhesiveness between the inner layer and the outer layer, and provided an inferior result also in pulsation-reducing property.

The fuel hose may be suitably used as a hose for transporting an automotive fuel, such as gasoline, alcohol-mixed gasoline, diesel fuel, compressed natural gas (CNG), or liquefied petroleum gas (LPG). In addition, the fuel hose of the present invention is used as an automotive fuel hose, but may also be used as a fuel hose for, for example, a transportation machine other than an automobile (e.g., an aircraft, an industrial transportation vehicle, such as a forklift, an excavator, or a crane, or a railroad vehicle).

Although specific forms of embodiments of the present invention have been described above and illustrated in the accompanying drawings in order to be more clearly understood, the above description is made byway of example and not as a limitation to the scope of the present invention. It is contemplated that various modifications apparent to one of ordinary skill in the art could be made without departing from the scope of the invention.

What is claimed is:

1. A fuel hose, comprising:
a tube-shaped inner layer formed of a component (A);
an intermediate layer formed of a component (B), which is arranged in contact with an outer peripheral surface of the inner layer; and
an outer layer formed of a component (C), which is arranged in contact with an outer peripheral surface of the intermediate layer,
wherein the layers are bonded to each other;
wherein the component (A) is at least one selected from the group consisting of polyamide 9T, an ethylene-vinyl alcohol copolymer resin and acid-modified polyethylene;
wherein the component (B) is a polyamide terpolymer having copolymerized therein the following components (b1), (b2), and (b3):
(b1) polyamide 6;
(b2) at least one selected from polyamide 66 and polyamide 610; and
(b3) polyamide 12;
wherein the component (B) consists essentially of the components (b1), (b2) and (b3), wherein, in the polyamide terpolymer (B), a content of the component (b1) is from 60 wt % to 90 wt %, a content of the component (b2) is from 5 wt % to 20 wt %, and a content of the component (b3) is from 5 wt % to 20 wt %, and
wherein the component (C) is an aliphatic polyamide resin, wherein the aliphatic polyamide resin does not contain any of polyamide 6 and polyamide 66.

2. The fuel hose according to claim 1, wherein the aliphatic polyamide resin (C) comprises at least one selected from the group consisting of polyamide 12, polyamide 11, polyamide 1012, polyamide 1010, polyamide 612, and polyamide 610.

3. The fuel hose according to claim 1, wherein the component (b2) comprises polyamide 66.

4. The fuel hose according to claim 1, wherein the component (A) is polyamide 9T.

5. The fuel hose according to claim 1, wherein the component (C) comprises polyamide 12.

6. The fuel hose according to claim 1, wherein the component (A) is polyamide 9T, and wherein the component (b2) comprises polyamide 66.

7. The fuel hose according to claim 1, wherein the component (A) is polyamide 9T, and wherein the component (C) comprises polyamide 12.

8. The fuel hose according to claim 1, wherein the component (b2) comprises polyamide 66, and wherein the component (C) comprises polyamide 12.

9. The fuel hose according to claim 1, wherein the component (A) is polyamide 9T, wherein the component (b2) comprises polyamide 66, and wherein the component (C) comprises polyamide 12.

10. The fuel hose according to claim 1, wherein the thickness of the inner layer is from 0.05 mm to 0.4 mm, wherein the thickness of the intermediate layer is from 0.2 mm to 0.8 mm, and wherein the thickness of the outer layer is from 0.1 mm to 0.5 mm.

11. The fuel hose according to claim 1, wherein the thickness of the inner layer is from 0.05 mm to 0.3 mm, wherein the thickness of the intermediate layer is from 0.3 mm to 0.7 mm, and wherein the thickness of the outer layer is from 0.2 mm to 0.4 mm.

12. The fuel hose according to claim 1, which has an inner diameter of from 1 mm to 40 mm, and has an outer diameter of from 2 mm to 43 mm.

13. The fuel hose according to claim 1, which has an inner diameter of from 2 mm to 36 mm, and has an outer diameter of from 3 mm to 40 mm.

14. A fuel hose, comprising:
a tube-shaped inner layer formed of a component (A);
an intermediate layer formed of a component (B), which is arranged in contact with an outer peripheral surface of the inner layer; and
an outer layer formed of a component (C), which is arranged in contact with an outer peripheral surface of the intermediate layer,
wherein the layers are bonded to each other;
wherein the component (A) is polyamide 9T or an acid-modified ethylene-tetrafluoroethylene copolymer;
wherein the component (B) is a polyamide terpolymer having copolymerized therein the following components (b1), (b2), and (b3):
(b1) polyamide 6;
(b2) at least one selected from polyamide 66 and polyamide 610; and
(b3) polyamide 12;
wherein the component (B) consists essentially of the components (b1), (b2), and (b3);
wherein, in the polyamide terpolymer (B), a content of the component (b1) is from 60 wt % to 90 wt %, a content of the component (b2) is from 5 wt % to 20 wt %, and a content of the component (b3) is from 5 wt % to 20 wt %; and
wherein the component (C) is polyamide 12.

* * * * *